US007987884B2

(12) United States Patent
Aengenvoort et al.

(10) Patent No.: US 7,987,884 B2
(45) Date of Patent: Aug. 2, 2011

(54) INSTALLATION FOR APPLYING GLUE TO FIBERS FOR THE PRODUCTION OF FIBERBOARD

(75) Inventors: Dieter Aengenvoort, Weeze (DE); Michael Schöler, Rheurdt (DE); Klaus Schürmann, Jüchen (DE); Lothar Sebastian, Duisburg (DE)

(73) Assignee: Siempelkamp Maschinen -Und Anlagen Bau GmbH + Co. KG, Krefeld (DE)

( * ) Notice: Subject to any disclaimer, the term of this patent is extended or adjusted under 35 U.S.C. 154(b) by 0 days.

(21) Appl. No.: 12/447,055

(22) PCT Filed: Oct. 27, 2007

(86) PCT No.: PCT/EP2007/009336

§ 371 (c)(1), (2), (4) Date: Dec. 2, 2009

(87) PCT Pub. No.: WO2008/071258

PCT Pub. Date: Jun. 19, 2008

(65) Prior Publication Data

US 2010/0108270 A1 May 6, 2010

(30) Foreign Application Priority Data

Dec. 13, 2006 (DE) ......................... 10 2006 058 626

(51) Int. Cl.
*B32B 41/00* (2006.01)

(52) U.S. Cl. ....................................... 156/378; 156/578

(58) Field of Classification Search .................. 156/378, 156/578, 62.2, 62.4, 278, 279, 297; 264/109, 264/116

See application file for complete search history.

(56) References Cited

U.S. PATENT DOCUMENTS 4,322,380 A * 3/1982 Bleymaier et al. ............ 264/438

FOREIGN PATENT DOCUMENTS

| | | |
|---|---|---|
| DE | 10247414 A1 * | 4/2004 |
| EP | 1537968 | 6/2005 |
| WO | WO-2004/035278 | 4/2004 |
| WO | WO-2004/035279 | 4/2004 |
| WO | WO-2005/065905 | 7/2005 |

OTHER PUBLICATIONS

Translation of DE 10247414 A1 from EPO machine translation. Clasen, et al. Apr. 2004.*

* cited by examiner

*Primary Examiner* — George R Koch, III

(74) *Attorney, Agent, or Firm* — Andrew Wilford

(57) ABSTRACT

The invention relates to an installation for applying glue to fibers for the production of fiberboard, especially MDF board or similar wood material board. Said installation comprises a fiber feed unit having at least one fiber feed conduit which opens into a fiber exit tube via an arched fiber deflection element and receives the air that is used to transport the fibers, a chute which is located downstream of the fiber exit tube, a glue application device which is located e.g. between the fiber exit tube and the chute and which has spray nozzles for spraying the fibers that emerge from the fiber exit tube and enter the chute with drops of glue, and a collection device, located downstream of the chute and having a transport device for collecting and optionally carrying off the fibers. The installation is characterized in that at least a part of the fiber deflection conduit is configured as a subdivided conduit having a plurality of partial conduits, said conduit being subdivided by one or more dividing walls that extend in the axial direction.

10 Claims, 3 Drawing Sheets

INSTALLATION FOR APPLYING GLUE TO FIBERS FOR THE PRODUCTION OF FIBERBOARD

CROSS REFERENCE TO RELATED APPLICATIONS

This application is the US national phase of PCT application PCT/EP2007/009336, filed 27 Oct. 2007, published 19 Jun. 2008 as WO2008/071258, and claiming the priority of German patent application 102006058626.3 itself filed 13 Dec. 2006, whose entire disclosures are herewith incorporated by reference.

FIELD OF THE INVENTION

The invention relates to an apparatus for applying glue to fibers for making fiberboard, in particular MDF board or similar wood-containing board, and having

- a fiber supply with at least one fiber-feed conduit that uses air for transporting fibers and that opens into a fiber-discharge pipe via an arcuate fiber-deflection conduit,
- a chute downstream of the fiber-discharge pipe,
- a gluing device provided e.g. between the fiber-discharge pipe and the chute and having spray nozzles for spraying with drops of glue the fibers emerging from the fiber-discharge pipe and entering the chute, and
- a collection device for catching and optionally carrying away the fibers arranged downstream of the chute.

Within the scope of the invention, MDF board means medium-density fiberboard. The collection device preferably has an air-permeable conveyor belt for catching and optionally carrying away the fibers as well as a suction device arranged below the conveyor belt for suctioning air out of the chute through the conveyor belt. The fiber-discharge pipe and chute are preferably essentially vertical. Furthermore, a secondary air feed device with one or more secondary air inlets is preferably provided for generating a secondary air flow surrounding the fiber stream in the chute, the secondary air also being drawn off by the suction device.

BACKGROUND OF THE INVENTION

Apparatuses for applying glue to fibers for making fiberboard of the type mentioned at the outset are known from DE 102 47 412 [WO 2004/035279], DE 102 47 413 [WO 2004/035278], and DE 10 2004 001 527 [WO 2005/065905]. The fibers are supplied pneumatically, glue coated after emerging from the fiber-discharge pipe, so that they then enter the chute and fall onto the air-permeable conveyor belt or are suctioned onto it. The fiber supply usually has a fiber distribution head that ensures a fiber deflection through an angle of about 90° up to about 180°, the fiber-feed conduit merging into the fiber-discharge pipe optionally with expansion of the cross section. Basically, the known measures have proven useful, but they are capable of being further developed.

OBJECT OF THE INVENTION

The object of the invention is to create an apparatus with the embodiment described above, with which fibers for making fiberboard, in particular MDF board, can be glue coated free from defects in an efficient and economic manner. In particular the object is to achieve a homogeneous application of glue to the entire fiber stream with a low expenditure in terms of apparatus and structure.

SUMMARY OF THE INVENTION

To attain this object, the invention teaches with a generic apparatus that the fiber-deflection conduit is formed in at least some regions or sections by one or more partitions running essentially in the axial direction as a subdivided conduit with several subconduits. In addition, the fiber-feed conduit can be formed in some regions, e.g. in a region connected to the fiber-deflection conduit, by one or more partitions running essentially in the axial direction, as subdivided conduits with several subconduits. Alternatively or additionally, there is also the possibility that the fiber-discharge pipe that is joined to the fiber-deflection conduit, is formed in some regions, e.g. in a region directly connected to the fiber-deflection conduit, by one or more partitions running in the axial direction as subdivided conduits with several subconduits. The fiber-feed conduit, fiber-deflection conduit and/or fiber-discharge pipe can thus have a circular, oval, elliptical or also rectangular or square cross section. Combinations are also possible. It can thus be useful for reasons of production engineering to make the fiber-feed conduit and the fiber-deflection conduit with a rectangular or square cross section, while the fiber-discharge pipe can preferably have a round cross section at least in some regions.

The invention is thereby based on the realization that with conventional fiber-feed conduits or deflection conduits, which are formed as simple pipes with a rectangular or circular cross section, there is a risk of a “separation” of the fibers In particular in the region of fiber deflection, it can occur that—in particular with large pipe diameters—the fibers are concentrated in one region of the conduit cross section during discharge from the fiber-deflection conduit. Separation of this type is effectively counteracted by the subdivision according to the invention of the fiber-deflection conduit and/or the fiber-feed conduit and/or the fiber-discharge pipe. The fiber stream is namely subdivided by the individual subconduits into several substreams, so that a separation can occur at most within the individual substreams that have a much smaller cross section than the total conduit cross section. In this connection it is expedient if the fiber-deflection conduit and/or the fiber-feed conduit and/or the fiber feed pipe are subdivided at least in some regions by partitions into two to ten, e.g. three to eight subconduits. Preferably four to six subconduits are used. The individual cross sections of the subconduits can have a different cross section, e.g. also have a rectangular cross section. In particular with the use of conduits with a round cross section, however, more complex cross-sectional forms of the individual conduits can also occur. The fiber-deflection conduit thereby has for deflection the shape of a circle segment with predetermined base diameter, an angular extent of about 90° to about 180°. A particularly compact structure is rendered possible with an angular extent of 180°, i.e. the fibers are fed from the bottom upward via an essentially vertical fiber-feed conduit, then deflected via the fiber-deflection conduit through an angle of 180° and finally introduced via the also essentially vertical fiber-discharge pipe into the region of the gluing device, whence they then enter the also essentially vertical chute.

In a preferred further embodiment the invention proposes that the arc diameter of the fiber-deflection conduit has approximately 3 times to 10 times, preferably 5 times to 10 times the conduit diameter. The invention consequently proposes that the fibers are transferred from the fiber-feed conduit via the fiber-deflection conduit into the fiber-discharge pipe via an elongated arc that opens into a straight vertical pipe, namely the fiber-discharge pipe. Such a relatively large arc diameter further counteracts separation of the fibers so that a homogeneous fiber stream within the fiber-discharge pipe is also generated thereby, which then enters the gluing zone.

Furthermore, the invention proposes in an advantageous further development that the essentially straight and vertical fiber-discharge pipe and forming a settling section has a length that is approximately 2 times to 20 times, e.g. 5 times to 15 times, preferably 10 times to 15 times the pipe diameter of the fiber-discharge pipe. Such a long settling section or such a long fiber-discharge pipe makes it possible for any separation possibly occurring to be eliminated in the region of the fiber deflection so that then an extremely homogenous fiber stream enters the gluing zone from the fiber-discharge pipe.

BRIEF DESCRIPTION OF THE DRAWING

The invention is explained in more detail below based on a drawing showing only one embodiment. Therein.

SPECIFIC DESCRIPTION

Figure 1:
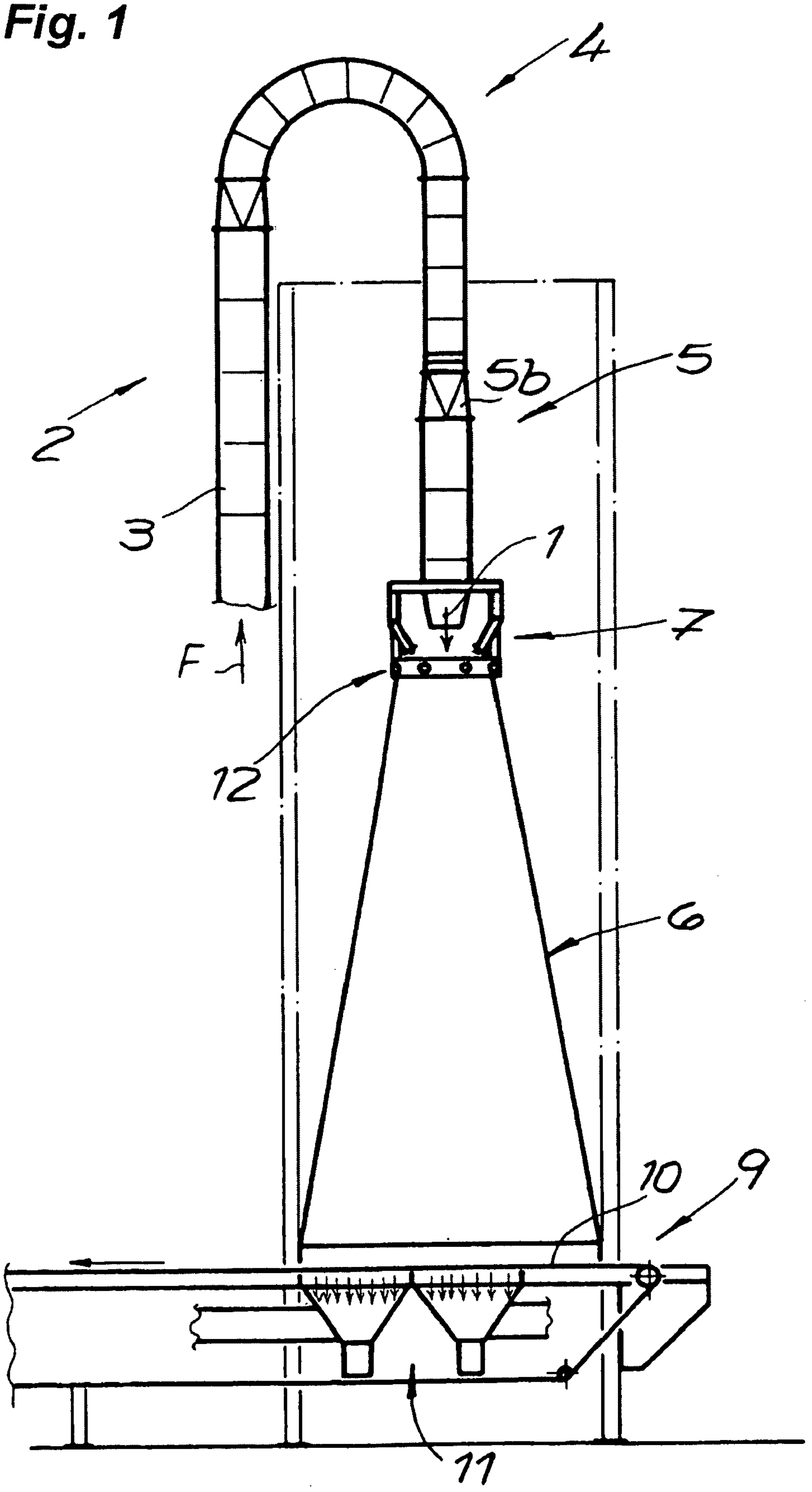
FIG. 1 shows an apparatus for applying glue to fibers in a simplified diagrammatic representation.

The figures show an apparatus for applying glue to fibers 1 for making fiberboard, in particular MDF board. The apparatus is set up for continuous operation and has a fiber-supply means 2 with a fiber-feed conduit 3 through which air F is blown for the fiber transport, the fiber-feed conduit opening via an arcuate fiber-deflection conduit 4 into a fiber-discharge pipe 5. A chute 6 downstream of this fiber-discharge pipe 5 extends basically vertically and straight. Between the fiber-discharge pipe 5 and the chute 6 in a gluing zone a device 7 provided with a plurality of spray nozzles 8 sprays glue drops into the fibers 1 emerging from the fiber-discharge pipe 5 and entering the chute 6. A collection device 9 for catching and conveying away the glue-coated fibers is provided downstream of the chute 6. This collection device 9 has a foraminous conveyor belt 10 for catching and carrying away the fibers as well as a suction device 11 arranged below the conveyor belt for suctioning air from the chute 6 through the conveyor belt 10. This conveyor belt 10 is embodied as a mesh or filter belt. Consequently, the fibers emerging from the fiber-discharge pipe 5 and subsequently glue coated reach the conveyor belt 10 via the chute 6. The glue-coated fibers come to rest on this conveyor belt 10. Any unused glue descending in the chute 6 reaches the fibers on the conveyor belt 10, so that a full utilization of the glue is ensured and soiling of the apparatus by unused glue are reliably avoided. The gluing device 7 ensures a homogeneous application of glue and has a plurality of spray nozzles 8 on a nozzle plate or form a nozzle plate of this type. The chute 6 has a cross section that flare downward. As further shown by example in the figures under the gluing device 7 and consequently at the upper end of the chute 6 a secondary-air feed device 12 with one or more secondary-air inlets 13 is provided for generating a secondary-air flow M surrounding the fiber stream in the chute 6. Consequently, the conveying air F as well as the secondary air M as well as any ambient air U entering the apparatus or fed to the apparatus is drawn off through the suction device 11.

Figures 2, 4:
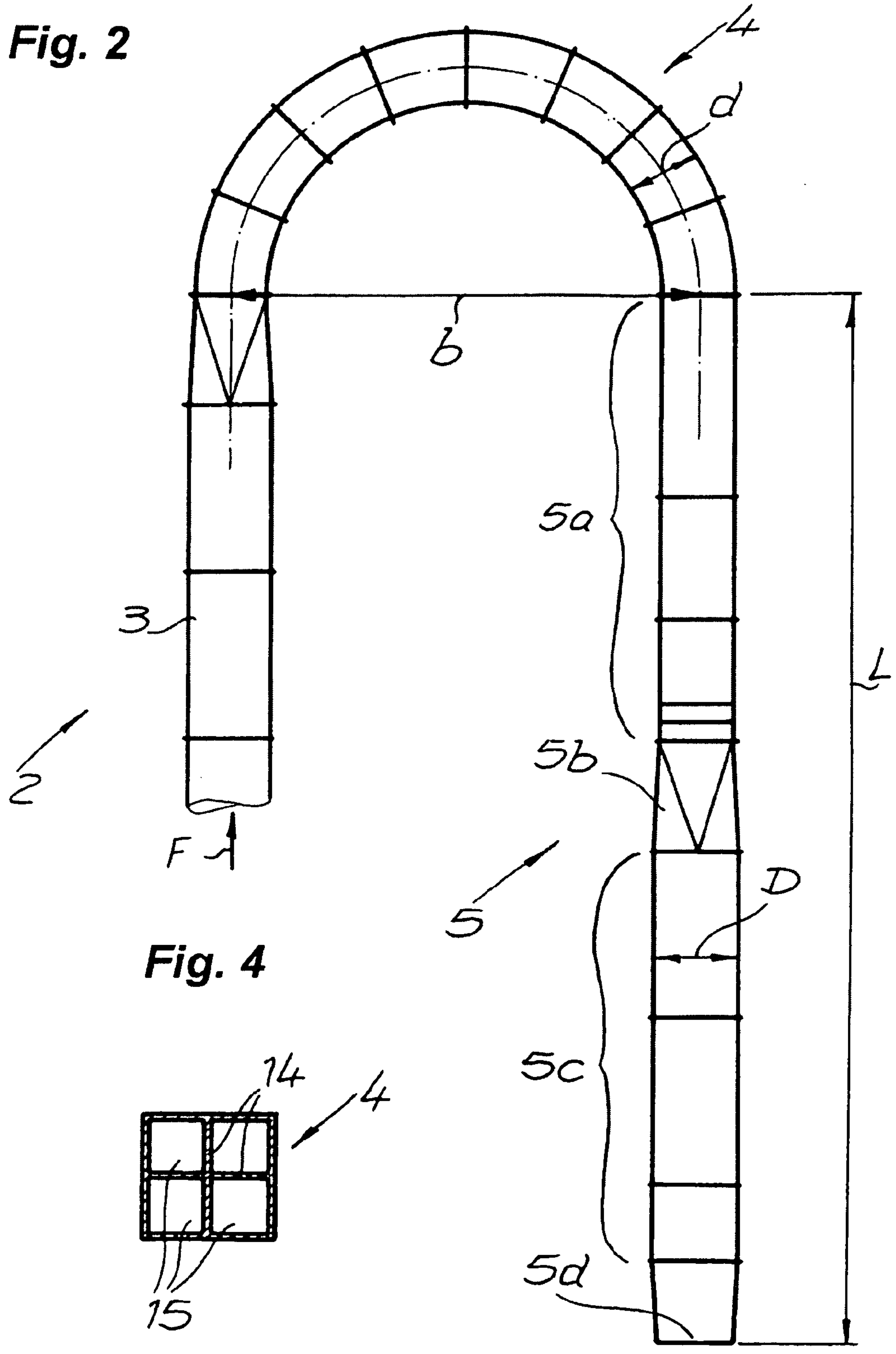
FIG. 2 is an enlarged section of the structure of FIG. 1 in the region of the fiber deflection.
FIG. 4 is a cross section through the fiber-deflection conduit.
Figure 3:
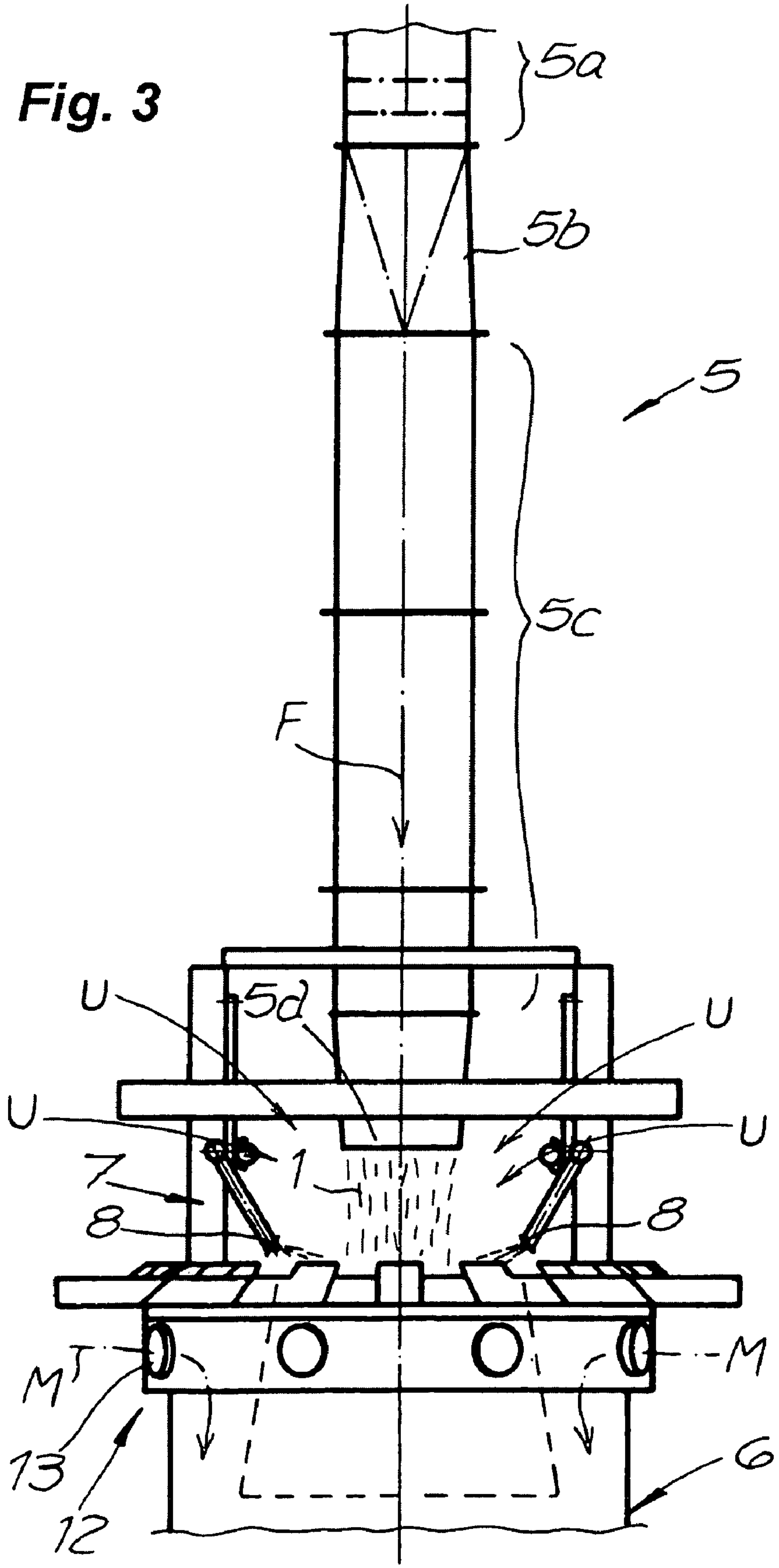
FIG. 3 is an enlarged section of the structure of to FIG. 1 in the region of the fiber gluing.

According to the invention the fiber deflection device 4 is constituted (e.g. over its entire length) as a subdivided conduit with several subconduits 15 by one or more partitions 14 running essentially in the axial direction. This is indicated in FIG. 4. The fiber-deflection conduit 4 is as shown in FIG. 2 the arcuate conduit between, on the one hand, the fiber-feed conduit 3 that extends vertically and straight and, on the other hand, the fiber-discharge pipe 5 also formed vertical and straight. In addition, there is the possibility for sections of the fiber-feed conduit 3 and/or of the fiber-discharge 5 also to have such partitions and consequently also to be subdivided into several subconduits, the division preferably corresponding to the division of the fiber-deflection conduit. This is not shown in the figures. In the illustrated embodiment, the fiber-feed conduit 3 as well as the fiber-deflection conduit 4 are or a rectangular or square cross section. The fiber-discharge pipe 5 has an upper section 5*a* directly connected to the fiber-deflection conduit 4 with the same rectangular or square cross section, to which then a lower section 5*c* of circular cross section is connected via a transition piece 5*b*, so that fiber stream with a circular cross section is generated in the lower region of the fiber-discharge pipe 5, which fiber stream then enters the gluing zone. FIG. 2 shows that the fiber-discharge pipe 5 has a "nozzle-like" diameter reduction 5*d* at its outlet.

In the illustrated embodiment, the fiber-deflection conduit 4 is subdivided into only four subconduits 15, the rectangular or square conduit cross section being then subdivided into similarly rectangular- or square-section partial conduits.

FIG. 2 further shows how the fiber-deflection conduit is shaped for a deflection as a circle segment with a predetermined arc diameter b and has an angular extent of about 180°. The fibers 1 consequently reach the also vertical fiber-discharge pipe 5 from the vertical fiber-feed conduit 3 after deflection through about 180° through an arc with an arc diameter b. This fiber-deflection conduit 4 is shaped as an elongated arc, i.e. the arc diameter b of the fiber-deflection conduit is approximately 5 times to 10 times the conduit cross-sectional width d.

Furthermore, FIG. 2 particularly shows how the essentially straight and vertical fiber-discharge pipe has a (overall) length L that is approximately 10 times to 15 times a diameter D of this fiber-discharge pipe 5. The pipe diameter D here means the largest diameter of the round cross-section.

If rectangular or square conduit cross-sections or conduit cross sections are described in the scope of the invention, the diameter of these conduits or pipes means the side length of the long edge of a square of this type.

The invention is not otherwise limited to the application of glue to fibers for making fiberboard, in fact the apparatus according to the invention is also suitable for the application of glue to chips for making chipboards or OSB boards, taking into account a corresponding dimensioning of the individual units.

The invention claimed is:

1. An apparatus for making fiberboard, the apparatus comprising:

an arcuate and elongated fiber-deflection conduit having an intake end and a downwardly open outlet end;

a plurality of partitions extending longitudinally in the arcuate fiber-deflection conduit and subdividing same internally into a plurality of arcuate and longitudinally extending subconduits extending between the intake end and outlet end;

fiber-supply means for blowing fibers with air into the intake end of the deflection conduit and longitudinally through all the subconduits;

a laterally closed vertical chute extending downward from the outlet end of the deflection conduit, whereby fibers exiting the subconduits at the outlet end drop as a stream in the chute;

means including nozzles between the outlet end and the chute for spraying fibers into an upstream end of the stream and thereby coating the fibers; and collection means underneath the chute for catching and conveying away the glue-coated fibers as a mat.

2. The apparatus defined in claim 1 wherein the arcuate deflection conduit has an angular extent of about 180° between its intake end and outlet end and the intake end opens downward.

3. The apparatus defined in claim 1 wherein the arcuate deflection conduit is of rectangular section and the partitions are substantially planar.

4. The apparatus defined in claim 3 wherein the arcuate deflection conduit is of square section.

5. The apparatus defined in claim 1 wherein the arcuate deflection conduit is formed between its ends as a circle segment.

6. The apparatus defined in claim 1 wherein the chute flares downward.

7. The apparatus defined in claim 1 wherein the collection means includes a foraminous belt continuously moving horizontally underneath the chute.

8. The apparatus defined in claim 7 wherein the collection means includes blower means for aspirating air downward through the belt.

9. The apparatus defined in claim 1, further comprising:

a fiber-discharge pipe extending downward from the deflection-conduit outlet end to the chute; and further partitions internally subdividing the discharge pipe into a plurality of vertical subpassages.

10. The apparatus defined in claim 1 wherein an arc diameter of the arcuate deflection conduit is at least 3 times a maximum cross-sectional dimension of the arcuate deflection conduit.

* * * * *